US011988985B2

(12) United States Patent
Miyazaki

(10) Patent No.: US 11,988,985 B2
(45) Date of Patent: *May 21, 2024

(54) IMAGE FORMING APPARATUS AND METHOD FOR DETERMINING A CAUSE ON AN ABNORMALITY

(71) Applicant: TOSHIBA TEC KABUSHIKI KAISHA, Tokyo (JP)

(72) Inventor: Yasunari Miyazaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,265

(22) Filed: Feb. 3, 2023

(65) Prior Publication Data

US 2023/0185224 A1 Jun. 15, 2023

Related U.S. Application Data

(63) Continuation of application No. 17/399,243, filed on Aug. 11, 2021, now Pat. No. 11,599,051.

(51) Int. Cl.
*G03G 15/00* (2006.01)
*G03G 15/02* (2006.01)

(52) U.S. Cl.
CPC ..... *G03G 15/5037* (2013.01); *G03G 15/0266* (2013.01); *G03G 15/55* (2013.01)

(58) Field of Classification Search
None
See application file for complete search history.

(56) References Cited

U.S. PATENT DOCUMENTS

| | | | | |
|---|---|---|---|---|
| 5,619,308 A | | 4/1997 | Kinoshita et al. | |
| 7,881,627 B2 | * | 2/2011 | Hano | G03G 15/065 399/48 |
| 8,953,957 B2 | | 2/2015 | Takehisa et al. | |
| 11,599,051 B1 | * | 3/2023 | Miyazaki | G03G 15/0266 |
| 2016/0011536 A1 | * | 1/2016 | Hanamoto | G03G 15/043 347/118 |

FOREIGN PATENT DOCUMENTS

| | | |
|---|---|---|
| JP | 01-271770 | 10/1989 |
| JP | 07-56414 | 3/1995 |
| JP | 08-95321 | 4/1996 |
| JP | 09-244353 | 9/1997 |
| JP | 2007-025533 | 2/2007 |

OTHER PUBLICATIONS

Non-Final Office Action for U.S. Appl. No. 17/399,243 mailed Aug. 2, 2022.

* cited by examiner

*Primary Examiner* — Arlene Heredia
(74) *Attorney, Agent, or Firm* — Amin, Turocy & Watson, LLP

(57) ABSTRACT

An image forming apparatus includes a photoconductor, a charger, a detection unit, and a determination unit. The charger charges the photoconductor. The detection unit detects an actual charging potential of the photoconductor after the photoconductor is charged by the charger. The determination unit determines one of a plurality of causes related to a charging abnormality of the photoconductor based on a relationship between a standard charging potential of the photoconductor to be obtained by charging by the charger and a charging potential detected by the detection unit.

17 Claims, 6 Drawing Sheets

| | RALa | | RALb | | RALc | |
|---|---|---|---|---|---|---|
| RATa | COAa | COBa | COAd | COBd | COAg | COBg |
| RATb | COAb | COBb | COAe | COBe | COAh | COBh |
| RATc | COAc | COBc | COAf | COBf | COAi | COBi |

IMAGE FORMING APPARATUS AND METHOD FOR DETERMINING A CAUSE ON AN ABNORMALITY

CROSS-REFERENCE TO RELATED APPLICATION

This application is a Continuation of application Ser. No. 17/399,243 (now U.S. Pat. No. 11,599,051) filed on Aug. 11, 2021, the entire contents of which are incorporated herein by reference.

FIELD

Embodiments described herein relate generally to image forming apparatuses and methods related thereto.

BACKGROUND

There is known an electrophotographic image forming apparatus in which an electrostatic latent image is formed by partially exposing a photoconductive surface of a photoconductor uniformly charged by a charger according to an image and the electrostatic latent image is visualized by developing the electrostatic latent image.

In such a type of the image forming apparatus, since the photoconductor and the charger deteriorate with use, the photoconductor and the charger are recommended to be replaced before the image quality is significantly affected. Then, in such a type of the image forming apparatus, a state of the deterioration of the photoconductor and the charger is estimated based on the number of images formed.

However, the actual defect is not detected, and the cause cannot be determined.

DETAILED DESCRIPTION

In general, according to one embodiment, an image forming apparatus includes a photoconductor, a charger, a detection unit, and a determination unit. The charger charges the photoconductor. The detection unit detects the actual charging potential of the photoconductor after being charged by the charger. The determination unit determines one of a plurality of causes related to a charging abnormality of the photoconductor based on a relationship between a standard charging potential of the photoconductor to be obtained by charging by the charger and a charging potential detected by the detection unit. According to another embodiment, a method for an image forming apparatus involves detecting an actual charging potential of a photoconductor by a charger after the photoconductor is charged by the charger; and determining one of a plurality of causes related to a charging abnormality of the photoconductor based on a relationship between a standard charging potential of the photoconductor obtained by charging by the charger and a charging potential detected.

Hereinafter, embodiments will be described with reference to the drawings. It is noted that, in the following embodiment, a multi-function peripheral (MFP) provided with an image forming apparatus as a printer will be described as an example. The contents of various operations and various processes described below are examples, and changing the order of some operations and processes, omitting some operations and processes, adding other operations and processes, and the like can be appropriately performed.

Figure 1:
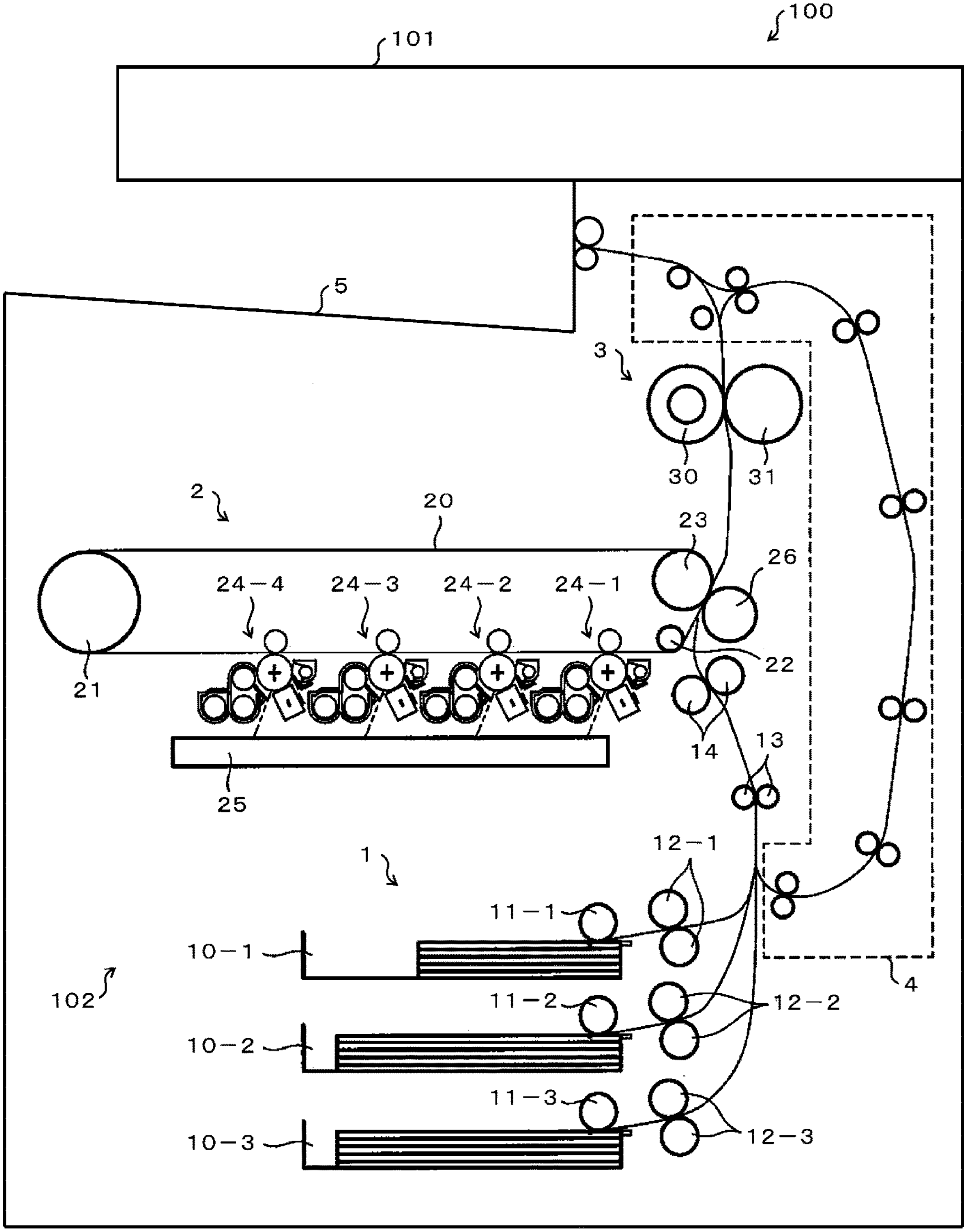
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of a document and generates an image data corresponding to the image. The scanner 101 uses an image sensor such as a charge-coupled device (CCD) line sensor to generate an image data according to the reflected light image from a reading surface of the document. The scanner 101 scans the document mounted on a platen by an image sensor that moves along the document. Alternatively, the scanner 101 scans the document conveyed by an auto document feeder (ADF) with a fixed image sensor.

The printer 102 forms an image on a medium which is a target of image-formation by an electrophotographic method. The medium is typically print paper such as cut paper. Therefore, in the following, it will be described that the print paper is used as a medium. However, as the medium, a sheet material made of paper different from the cut paper may be used, or a sheet material made of a material such as resin other than paper may be used. The printer 102 has a color printing function for printing a color image on the print paper and a monochrome printing function for printing a monochrome image on the print paper. The printer 102 forms a color image by overlapping element images using, for example, developers of three colors of yellow, magenta, and cyan or developers of four colors of the three colors and black. The printer 102 forms a monochrome image by using, for example, a black developer. The developer is, for example, toner. The developer may contain, for example, toner and carriers. However, the printer 102 may have only one of the color printing function and the monochrome printing function.

In the configuration example illustrated in FIG. 1, the printer 102 includes a paper feed unit 1, a print engine 2, a fixing unit 3, an automatic double-sided unit (ADU) 4, and a paper ejection tray 5.

The paper feed unit 1 includes paper feed cassettes 10-1, 10-2, and 10-3, pickup rollers 11-1, 11-2, and 11-3, convey rollers 12-1, 12-2, and 12-3, convey roller 13 and registration roller 14.

The paper feed cassettes 10-1, 10-2, and 10-3 each store print paper in a stacked state. The print papers stored in the paper feed cassettes 10-1, 10-2, and 10-3 may be different types of print papers having different sizes and materials or may be the same type of print papers. The paper feed unit 1 may also include a manual feed tray.

The pickup rollers 11-1, 11-2, and 11-3 respectively pick up sheets of print paper one by one from the paper feed cassettes 10-1, 10-2, and 10-3. The pickup rollers 11-1, 11-2, and 11-3 send the picked-up print paper into the convey rollers 12-1, 12-2, and 12-3.

The convey rollers 12-1, 12-2, and 12-3 send the print paper sent from the pickup rollers 11-1, 11-2, and 11-3 via a conveyance path formed by a guide member (not illustrated) to the convey roller 13.

The convey roller 13 further conveys the print paper sent from any of the convey rollers 12-1, 12-2, and 12-3, and sends the print paper into the registration roller 14.

The registration roller 14 corrects the inclination of the print paper. The registration roller 14 adjusts the timing of sending the print paper into the print engine 2.

The paper feed cassette, the pickup roller, and the convey roller are not limited to three sets, and any number of sets may be provided. If the manual feed tray is provided, it is not necessary to provide a set of the paper feed cassette and the pickup roller and the convey roller paired with the paper feed cassette.

The print engine 2 includes a belt 20, support rollers 21, 22, and 23, image forming units 24-1, 24-2, 24-3, and 24-4, an exposure unit 25, and a transfer roller 26.

The belt 20 has an endless shape and is supported by the support rollers 21, 22, and 23 to maintain the state illustrated in FIG. 1. The belt 20 rotates counterclockwise in FIG. 1 as the support roller 21 rotates. The belt 20 temporarily carries an image of a developer to be formed on the print paper on a surface (hereinafter, referred to as an image-carrying surface) located on the outside. For example, semi-conductive polyimide is used for the belt 20 from the viewpoint of heat resistance and abrasion resistance. The so-called sub-scanning is implemented by the movement of the image-carrying surface with the rotation of the belt 20, and thus, the moving direction of the image-carrying surface is also referred to as a sub-scanning direction.

Each of the image forming units 24-1 to 24-4 includes a photoconductor, a charger, a developing device, a transfer device, and a cleaner and has a well-known structure for performing image formation in cooperation with the exposure unit 25 in an electrophotographic manner. The image forming units 24-1 to 24-4 are disposed along the belt 20 in a state in which the axial directions of the respective photoconductors are parallel to each other. The image forming units 24-1 to 24-4 differ only in colors of the developers used and have the same structure and operation. The image forming unit 24-1 forms an element image by using, for example, a black developer. The image forming unit 24-2 forms an element image by using, for example, a cyan developer. The image forming unit 24-3 forms an element image by using, for example, a magenta developer. The image forming unit 24-4 forms an element image by using, for example, a yellow developer. The image forming units 24-1 to 24-4 allow the element images of the colors to overlap each other on the image-carrying surface of the belt 20. As a result, the image forming units 24-1 to 24-4 form a color image in which the element images of the respective colors are overlapped on the image-carrying surface of the belt 20 at the time of passing through the image forming unit 24-1. It is noted that, although not illustrated, containers storing the developers of the respective colors are disposed, for example, in a space above the belt 20.

Figure 2:
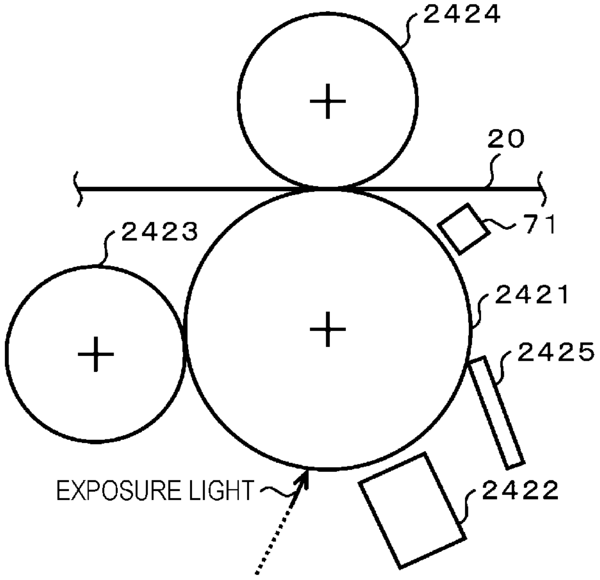
FIG. 2 is a diagram illustrating a portion of a configuration of an image forming unit illustrated in FIG. 1.

FIG. 2 is a diagram illustrating a portion of the configuration of the image forming units 24-1 to 24-4.

Since the image forming units 24-1 to 24-4 have the same configuration as described above, FIG. 2 illustrates only one configuration of the image forming units 24-1 to 24-4.

Each of the image forming units 24-1 to 24-4 includes a photoconductor 2421, a charger 2422, a developing sleeve 2423, a transfer roller 2424, and a cleaning blade 2425.

The photoconductor 2421 is configured by applying a photoconductive material to a curved surface of a base material made of a conductor such as aluminum formed in a cylindrical shape to form a photoconductive layer. It is noted that, in the following, the curved surface of the photoconductor 2421 is referred to as a photoconductive surface. The photoconductor 2421 is rotatably supported by the casing of the image forming unit 24-1 or the like in a posture in FIG. 2 in which the axial center direction is directed to the depth direction.

The charger 2422 uniformly charges the photoconductive surface of the photoconductor 2421 to a predetermined potential. Typically, a well-known device of a Scorotron type is used as the charger 2422. Another type of well-known device such as a charging roller method may be used as the charger 2422.

The developing sleeve 2423 is an element of the developing device. The developing sleeve 2423 has a columnar shape and is rotatably supported by a casing of the developing device or the like in a posture in which the axial center direction is directed in the depth direction in FIG. 2. A portion of the curved surface of the developing sleeve 2423 is located in the storing space formed inside the casing, and another portion of the curved surface is located outside the casing. The portion of the curved surface of the developing sleeve 2423 located outside the casing is close to the photoconductive surface of the photoconductor 2421. It is noted that the storing space is a space for storing an unused developer.

The transfer roller 2424 is an element of the transfer device. The transfer roller 2424 has a columnar shape and is rotatably supported by a casing of the transfer device or the like in a posture in which the axial center direction is directed in the depth direction in FIG. 2. The transfer roller 2424 faces the photoconductor 2421 and interposes the belt 20 between the transfer roller 2424 and the photoconductive surface of the photoconductor 2421.

The cleaning blade 2425 is an element of the cleaner. The cleaning blade 2425 has a plate shape and is attached to an accommodating container of the cleaner in a state where the tip is in contact with or close to the photoconductive surface of the photoconductor 2421. The cleaning blade 2425 scrapes off the developer adhering to the photoconductive surface of the photoconductor 2421 into the storage container.

The exposure unit 25 of FIG. 1 exposes each of the photoconductors 2421 of the image forming units 24-1 to 24-4 according to the image data representing the element images of the respective colors. As the exposure unit 25, a laser scanner, a light emitting diode (LED) head, or the like is used. If the laser scanner is used, the exposure unit 25 includes, for example, a semiconductor laser element, a polygon mirror, an imaging lens system, and a mirror. Then, the exposure unit 25 allows a laser beam emitted from the semiconductor laser element according to the image data to be selectively incident on each of the photoconductors 2421 of the image forming units 24-1 to 24-4 by switching the emission direction by the mirror. The exposure unit 25 scans the laser beam with a polygon mirror in the axial direction of the photoconductor 2421, that is, in the depth direction in FIG. 1. The scanning of the laser beam is a so-called main scanning, and the direction of the scanning is referred to as a main scanning direction.

The transfer roller 26 is disposed in parallel with the support roller 23, and interposes the belt 20 with the support roller 23. The transfer roller 26 interposes the print paper sent out from the registration roller 14 between the image-carrying surface of the belt 20 and the transfer roller 26. Then, the transfer roller 26 transfers the image of the developer formed on the image-carrying surface of the belt 20 to the print paper by utilizing an electrostatic force. That is, the transfer unit is configured with the support roller 23 and the transfer roller 26. In some cases, the developer may remain on the image-carrying surface of the belt 20 without being completely transferred to the print paper. Therefore, the developer adhering to the image-carrying surface of the belt 20 after passing between the support roller 23 and the transfer roller 26 is removed by a cleaner (not illustrated) up to the image forming unit 24-4.

Thus, the print engine 2 forms an image on the print paper sent by the registration roller 14 by an electrophotographic method.

The fixing unit 3 includes a fixing roller 30 and a pressurizing roller 31.

The fixing roller 30 accommodates a heater inside a hollow roller made of, for example, heat-resistant resin. The heater is, for example, an induction heating (IH) heater, but any other type of heaters can be appropriately utilized. The fixing roller 30 fixes the developer on the print paper by melting the developer adhering to the print paper sent out from the print engine 2.

The pressurizing roller 31 is provided in parallel with the fixing roller 30 in a state of being pressed against the fixing roller 30. The pressurizing roller 31 interposes the print paper sent out from the print engine 2 between the pressurizing roller 31 and the fixing roller 30 and presses the print paper against the fixing roller 30.

The ADU 4 includes a plurality of rollers and selectively performs the following two operations. In a first operation, the print paper passing through the fixing unit 3 is sent out toward the paper ejection tray 5 as it is. The first operation is performed when single-sided printing or double-sided printing is completed. In a second operation, the print paper passing through the fixing unit 3 is conveyed to the paper ejection tray 5, then switched back, and sent into the print engine 2. This second operation is performed when the image formation on only one side in the double-sided printing is completed.

The paper ejection tray 5 receives the print paper on which the image is formed and ejected.

Figure 3:
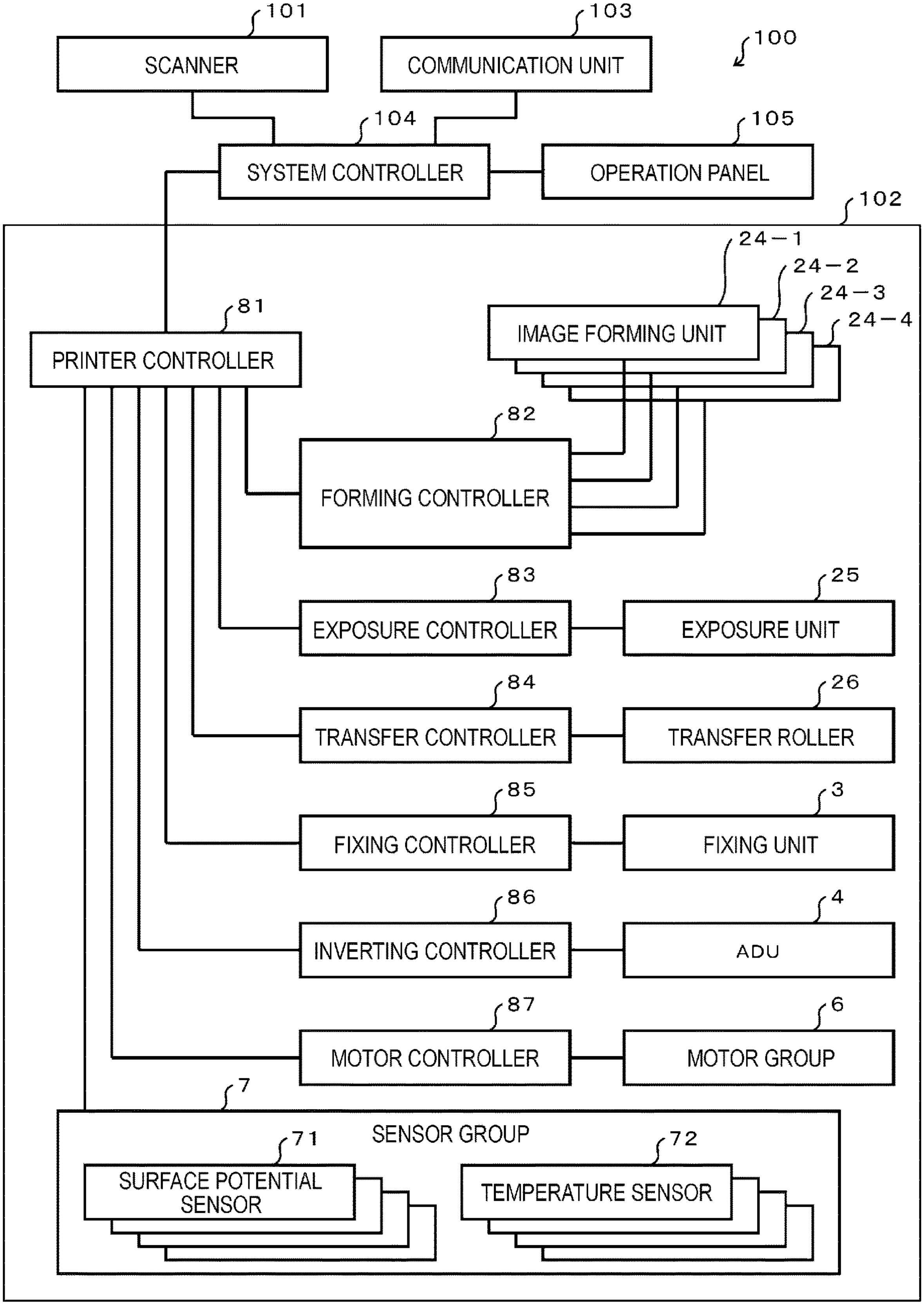
FIG. 3 is a block diagram schematically illustrating a configuration related to control of the MFP illustrated in FIG. 1.

FIG. 3 is a block diagram schematically illustrating a configuration related to control of the MFP 100. It is noted that, in FIG. 3, the same elements illustrated in FIG. 1 are denoted by the same reference numeral, and detailed description thereof will be omitted.

The MFP 100 includes a communication unit 103, a system controller 104, and an operation panel 105 in addition to the scanner 101 and the printer 102.

The communication unit 103 performs a process for communicating with an information terminal such as a computer device and an image terminal such as a facsimile machine via a communication network such as a local area network (LAN) and a public communication network.

The system controller 104 collectively controls components constituting the MFP 100 in order to implement the desired operation as the MFP 100. It is noted that the desired operation of the MFP 100 is, for example, an operation for implementing various functions implemented by an MFP in the related art.

The operation panel 105 includes an input device and a display device. The operation panel 105 inputs an instruction by the operator by the input device. The operation panel 105 displays various information to be notified to the operator by the display device. As the operation panel 105, for example, a touch panel can be used.

The above-mentioned fixing unit 3, ADU 4, image forming units 24-1 to 24-4, exposure unit 25, and transfer roller 26 included in the printer 102 are elements which are control targets. In addition to the above elements, the printer 102 includes a motor group 6 as an element which is a control target. The motor group 6 includes a plurality of motors for rotating pickup rollers 11-1, 11-2, and 11-3, convey rollers 12-1, 12-2, and 12-3, convey rollers 13, registration rollers 14, support rollers 21, transfer rollers 26, fixing roller 30, and, furthermore, the rollers included in the ADU 4, and the like.

The printer 102 further includes a sensor group 7, a printer controller 81, a forming controller 82, an exposure controller 83, a transfer controller 84, a fixing controller 85, an inverting controller 86, and a motor controller 87.

The sensor group 7 includes various sensors for monitoring the operating state of the apparatus. The sensor group 7 includes four surface potential sensors 71 and four temperature sensors 72. The four surface potential sensors 71 and the four temperature sensors 72 correspond to the image forming units 24-1 to 24-4, respectively.

As illustrated in FIG. 2, in the photoconductive surface of the photoconductor 2421 provided in the corresponding image forming unit, the surface potential sensor 71 is disposed to face the region located between the position where the transfer roller 2424 faces and the position where the cleaning blade 2425 is in contact with and to be separated from the photoconductive surface. The surface potential sensor 71 measures the charging potential of the photoconductive surface at the facing position. In the following, the charging potential measured by the surface potential sensor 71 is referred to as a surface potential. The position of the surface potential sensor 71 may be any position as long as the surface potential sensor 71 is disposed to face the photoconductive surface. The surface potential sensor 71 is an example of a detection unit.

The temperature sensor 72 is provided in the vicinity of the photoconductor 2421 provided in the corresponding image forming unit to detect the temperature. The temperature sensor 72 outputs the detected temperature.

The printer controller 81 illustrated in FIG. 2 collectively controls the components constituting the printer 102 in order to implement the desired operation as the printer 102 under the control of the system controller 104.

All of the forming controller 82, the exposure controller 83, the transfer controller 84, the fixing controller 85, the inverting controller 86, and the motor controller 87 operate under the control of the printer controller 81 and control operations of the image forming units 24-1 to 24-4, the exposure unit 25, the transfer roller 26, the ADU 4, and the motor group 6.

Figures 4, 5:
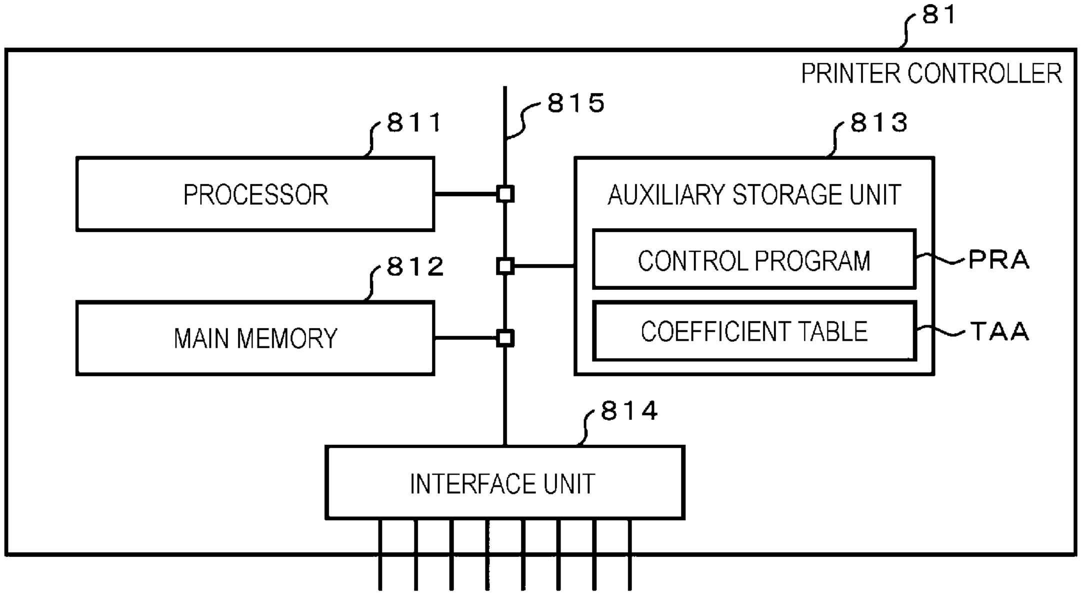
FIG. 4 is a block diagram illustrating a main circuit configuration of a printer controller illustrated in FIG. 3.
FIG. 5 is a diagram schematically illustrating a structure of a coefficient table.

FIG. 4 is a block diagram illustrating a main circuit configuration of the printer controller 81.

The printer controller 81 includes a processor 811, a main memory 812, an auxiliary storage unit 813, an interface unit 814, and a transmission line 815.

By connecting the processor 811, the main memory 812, and the auxiliary storage unit 813 by the transmission line 815, a computer that performs information processing for the above-described control is configured.

The processor 811 corresponds to the central portion of the computer. The processor 811 executes information processing described later according to an information processing program such as an operating system, middleware, and an application program.

The main memory 812 corresponds to a main memory portion of the computer. The main memory 812 includes a nonvolatile memory area and a volatile memory area. The main memory 812 stores an information processing program in the nonvolatile memory area. In some cases, the main memory 812 may store data necessary for the processor 811 to execute a process for controlling the components in a nonvolatile or volatile memory area. The main memory 812 uses the volatile memory area as a work area where data is appropriately rewritten by the processor 811.

The auxiliary storage unit 813 corresponds to an auxiliary storage portion of the computer. Well-known storage devices such as an electric erasable programmable read-only memory (EEPROM), a hard disk drive (HDD), and a solid state drive (SSD) can be used by itself or in combination of two or more as the auxiliary storage unit 813. The auxiliary storage unit 813 stores data used by the processor 811 to perform various processes and data generated by the processes of the processor 811. The auxiliary storage unit 813 stores the information processing program.

The interface unit 814 performs a well-known process for exchanging data with each of the sensor group 7, the forming controller 82, the exposure controller 83, the transfer controller 84, the fixing controller 85, the inverting controller 86, and the motor controller 87. As the interface unit 814, well-known interface devices or communication devices can be used by itself or in combination of two or more.

The transmission line 815 includes an address bus, a data bus, a control signal line, and the like and transmits data and control signals transmitted and received between the connected components.

The auxiliary storage unit 813 stores a control program PRA. The control program PRA is an application program and describes information processing for collectively controlling the components constituting the printer 102. The auxiliary storage unit 813 stores a coefficient table TAA. The coefficient table TAA represents two coefficients for each combination of several temperature ranges and several life ranges.

FIG. 5 is a diagram schematically illustrating an example of the data structure of the coefficient table TAA.

The example of FIG. 5 is an example in which three temperature ranges RATa, RATb, and RATc and three life ranges RALa, RALb, and RALc are set. The temperature ranges RATa, RATb, and RATc are defined as, for example, “less than 16° C.”, “16° C. or more and less than 26° C.”, and “26° C. or more”, respectively. Life is an index value of the degree of deterioration of the photoconductor 2421, and in the embodiment, the lift is set to a total number of print sheets using the photoconductor 2421. The life ranges RALa, RALb, and RALc are defined as, for example, “less than 50,000 sheets”, “50,000 sheets or more and less than 150,000 sheets”, and “150,000 sheets or more”, respectively. It is noted that, as the life, another numerical value such as the number of rotations of the photoconductor 2421 or a total printing time using the photoconductor 2421 may be used. Then, in the coefficient table TAA, for example, a coefficient COAa as the first coefficient and a coefficient COBa as the second coefficient are expressed for a combination of the temperature range RATa and the life range RALa. That is, all the coefficients COAa to COAi indicate values determined as the first coefficient. All the coefficients COBa to COBi indicate values determined as the second coefficient.

It is noted that the coefficient table TAA may include a combination of two or four or more temperature ranges and two or four or more life ranges, respectively. Which ranges the temperature range and life range are to be set as and which value each coefficient is to be set as may be determined as appropriate by the designer or the like of the MFP 100 considering various conditions such as the durability of the photoconductor 2421.

Next, the operation of the MFP 100 configured as described above will be described. It is noted that, in the following, the operations different from the other operations of another MFP in the related art will be mainly described, and the description of other operations will be omitted.

In the printer controller 81, the processor 811 executes information processing based on the control program PRA. Then, during the execution of a job involving printing, to print the image on the print paper under the control of the system controller 104, the processor 811 allows the image forming units 24-1 to 24-4, the exposure unit 25, the transfer roller 26, the ADU 4, and the motor group 6 to operate, for example, in a well-known manner via the forming controller 82, the exposure controller 83, the transfer controller 84, the fixing controller 85, the inverting controller 86, and the motor controller 87. Here, the processor 811 counts the total number of print sheets using the photoconductors 2421 and stores the count value in, for example, the auxiliary storage unit 813. It is noted that, for example, in the case of monochrome printing using the image forming unit 24-1, the image forming units 24-2 to 24-4 are not involved in the image formation. However, also in the image forming units 24-2 to 24-4, the photoconductor 2421 continues to rotate and is continuously subjected to mechanical friction by the cleaning blade 2425 or the like. According to the developing method, the photoconductor 2421 is constantly charged even in the image forming units 24-2 to 24-4. Due to such facts, the photoconductors 2421 of the image forming units 24-2 to 24-4 deteriorate even if the photoconductors 2421 are not involved in the image formation. Therefore, in the embodiment, the total number of print sheets is commonly used as the life related to the photoconductors 2421 of all the image forming units 24-2 to 24-4, regardless of whether to be monochrome printing. However, in the case of the above-mentioned monochrome printing, in the image forming units 24-2 to 24-4, exposure and the like are not performed, and the degree of deterioration of the photoconductors 2421 provided in the image forming units 24-2 to 24-4 is smaller than that of the photoconductor 2421 provided in the image forming unit 24-1. Known are various factors that the degree of deterioration of the photoconductors 2421 provided in each of the image forming units 24-1 to 24-4 can be varied. Then, the processor 811 may perform a correction process considering predefined ones of the above-described factors and may obtain a separate number of print sheets for each of the image forming units 24-2 to 24-4.

The monochrome printing can also be performed by operating all of the image forming units 24-1 to 24-4. Here, the processor 811 may count the total number of print sheets without distinguishing between color printing and monochrome printing.

The monochrome printing can be performed by operating any one of the image forming units 24-1 to 24-4 and not operating the other image forming units. Here, it is preferable that the processor 811 counts the total number of print sheets of the image forming unit which operates at least in monochrome printing, separately from the other image forming units.

When the inspection timing comes, the processor 811 individually executes the inspection processes as described below for the respective image forming units 24-1 to 24-4. It is noted that, in the following, the inspection process for the image forming unit 24-1 will be described. In the description of the inspection process, the photoconductor 2421, the charger 2422, the developing sleeve 2423, and the transfer roller 2424 are assumed to simply indicate the respective elements provided in the image forming unit 24-1.

The inspection timing may be determined in any manner by, for example, a creator of the control program PRA, an administrator of the MFP 100, or the like. The inspection timing is assumed to be determined, for example, as the timing after the MFP 100 is turned on. Alternatively, the inspection timing is assumed to be, for example, the timing after the printer 102 returns from the sleep state to the normal operating state.

The inspection timing is assumed to be set as, for example, a predetermined time. The inspection timing may be determined, for example, when the execution of the inspection is instructed by the operator. The inspection timing may be set when the number of print sheets exceeds a predetermined number.

Figure 6:
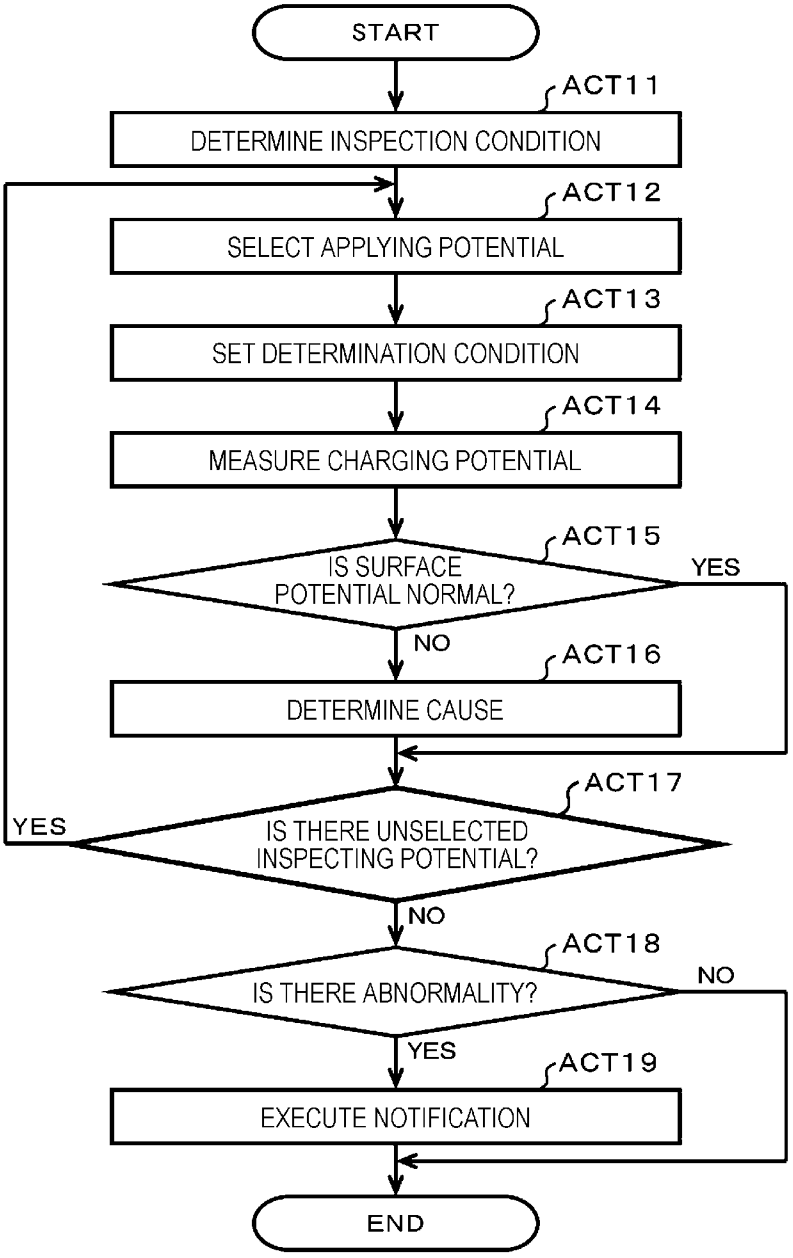
FIG. 6 is a flowchart of an inspection process.

FIG. 6 is a flowchart of the inspection process.

As ACT 11, the processor 811 determines the inspection conditions. For example, the processor 811 acquires the number of print sheets stored in the auxiliary storage unit 813 as described above as the current life of the photoconductor 2421. It is noted that, if the number of print sheets for each image forming unit is stored in the auxiliary storage unit 813, the processor 811 acquires the number of print sheets for the image forming unit 24-1. For example, the processor 811 acquires the temperature output by the temperature sensor 72 corresponding to the image forming unit 24-1 as representing the current ambient temperature of the photoconductor 2421. The processor 811 acquires the inspection potential stored in, for example, the auxiliary storage unit 813. A plurality of the inspection potentials are appropriately determined by, for example, a designer of the MFP 100 and are stored in the auxiliary storage unit 813. In the embodiment, three inspection potentials are defined, but the number of inspection potentials is any number. The three inspection potentials are assumed to be, for example, −300 V, −500 V, and −900 V.

As ACT 12, the processor 811 selects one of the inspection potentials acquired in ACT 11 as an application potential.

The processor 811 sets a determination condition as ACT 13. The determination conditions are a condition for determining whether the surface potential is normal and a condition for determining the cause if the surface potential is abnormal. In the embodiment, determination ranges RADa, RADb, RADc, RADd, RADe, RADf, and RADg are set. Hereinafter, a specific example of the process for setting the determination condition will be described in detail below.

First, the processor 811 obtains a standard value of the charging potential of the photoconductor 2421 obtained if a grid potential of the charger 2422 is used as the application potential. Herein, the charging amount of the photoconductor 2421 by the charger 2422 is affected by the life of the photoconductor 2421 and the ambient temperature of the photoconductor 2421. Therefore, the processor 811 determines the life range and the temperature range in which the life and the temperature acquired by ACT 11 are included, and the first coefficient and the second coefficient illustrated in the coefficient table TAA for a combination of the life range and the temperature range are obtained. Then, the processor 811 calculates a standard value VCa by the following formula.

$$VCa=COA\times Vg+COB$$

Herein, Vg is the application potential, and COA and COB are the first and second coefficients obtained above.

That is, for example, if the application potential is −300 V and the life and temperature acquired by ACT 11 are included within the life range RALb and the temperature range RATc, respectively, the processor 811 acquires the first coefficient COAf and the second coefficient COBf from the coefficient table TAA, and calculates the standard value VCa by the following formula.

$$VCa=\mathrm{COAf}\times(-300)+\mathrm{COBf}$$

It is preferable that the first coefficient and the second coefficient illustrated in the coefficient table TAA are defined so that, considering effect of the life of the photoconductor 2421 and the ambient temperature of the photoconductor 2421 on the charging amount of the photoconductor 2421 by the charger 2422, the effect is properly reflected by the formula described above. However, since the standard value VCa is not obtained in order to determine the charging potential with high accuracy, some error may be included. In some cases, since the charging amount of the photoconductor 2421 by the charger 2422 may be affected by other factors such as humidity, the above-mentioned formula may be appropriately modified considering the factors.

The processor 811 determines threshold values VTb and VTe as values obtained, for example, by subtracting and adding a predetermined first difference value from and to the standard value VCa, respectively. The processor 811 determines threshold values VTc and VTd as values obtained, for example, by subtracting and adding a predetermined second difference value smaller than the first difference value from and to the standard value VCa, respectively. The processor 811 determines a threshold value VTa as a value predetermined to be, for example, smaller than the threshold value VTb. The processor 811 determines a threshold value VTf as a value predetermined to be, for example, larger than the threshold value VTe. The first difference value and the second difference value may be appropriately determined by the designer of the MFP 100 or the like.

Figure 7:
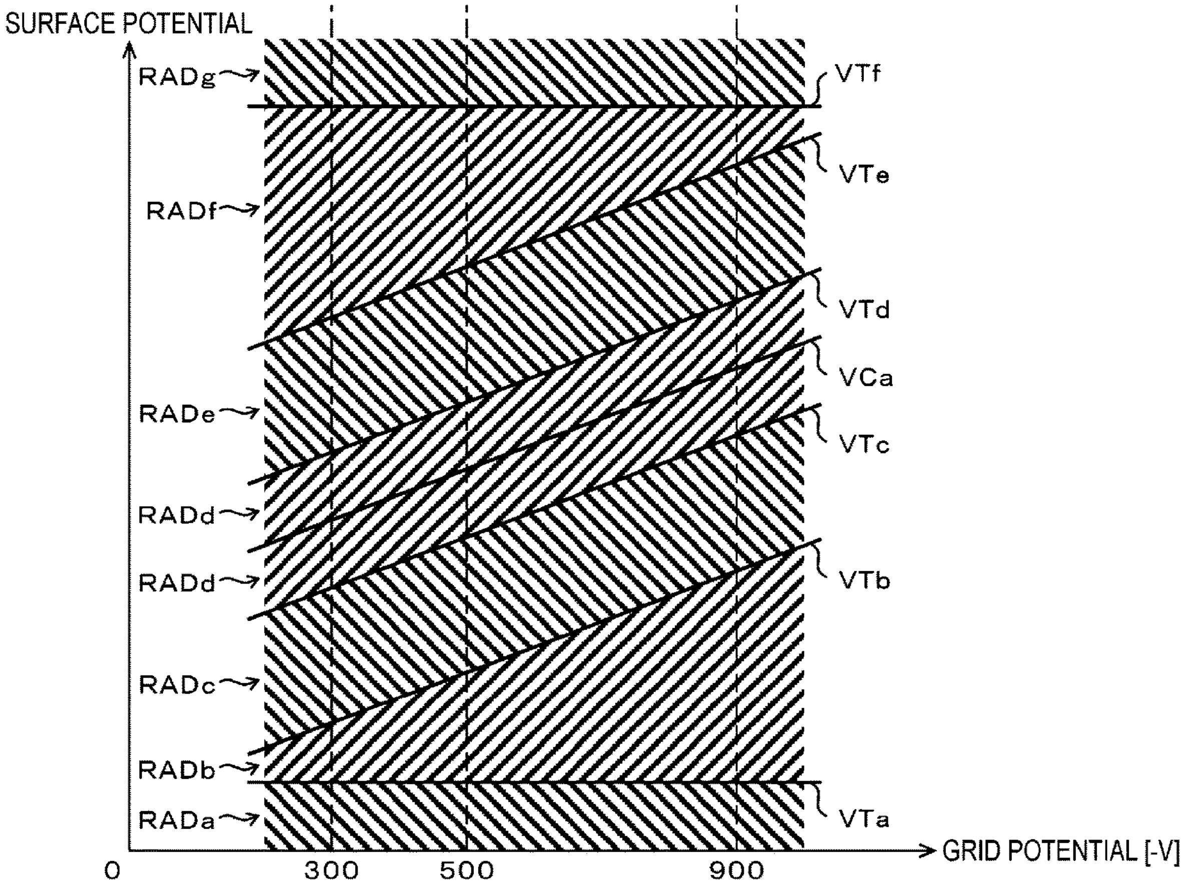
FIG. 7 is a diagram illustrating a distribution of a potential range for determining cause.

FIG. 7 is a diagram illustrating a distribution of a potential range for determining the cause.

As illustrated in FIG. 7, the standard value VCa increases in proportion to the absolute value of the grid potential. Therefore, the threshold values VTb, VTc, VTd, and VTe also increase in proportion to the absolute value of the grid potential. Then, the threshold values have a relationship of VTa>VTb>VTc>VTd>VTe>VTf.

The processor 811 sets the potential range of less than the threshold value VTa as the determination range RADa. The processor 811 sets the potential range of the threshold value VTa or more and less than the threshold value VTb as the determination range RADb. The processor 811 sets the potential range of the threshold value VTb or more and less than the threshold value VTc as the determination range RADc. The processor 811 sets the potential range of the threshold value VTc or more and less than the threshold value VTd as the determination range RADd. The processor 811 sets the potential range of the threshold value VTd or more and less than the threshold value VTe as the determination range RADe. The processor 811 sets the potential range of the threshold value VTe or more and less than the threshold value VTf as the determination range RADf. The processor 811 sets the potential range of the threshold value VTf or more as the determination range RADg.

The determination range RADd corresponds to a standard potential range including the standard value VCa as a central value. The determination ranges RADa, RADb, RADc, RADe, RADf, and RADg correspond to the third potential range, the second potential range, the first potential range, the fourth potential range, the fifth potential range, and the sixth potential range, respectively.

As ACT 14, the processor 811 measures the charging potential of the photoconductor 2421. The processor 811 sets, for example, the grid potential of the charger 2422 to the applied potential, stops the exposure, and turns off the voltage application to the developing sleeve 2423 and the transfer roller 2424. Then, the processor 811 acquires the surface potential measured by the surface potential sensor 71 as a measurement result if the charged region of the photoconductive surface passes though the facing position of the surface potential sensor 71.

As ACT 15, the processor 811 checks whether the surface potential as a measurement result in ACT 14 is normal. For example, the processor 811 checks whether the surface potential is within the determination range RADd. Then, if the surface potential is outside the determination range RADd, the processor 811 determines NO and proceeds to ACT 16.

As ACT 16, the processor 811 determines the cause of the abnormality, and stores the determination result in the main memory 812 or the auxiliary storage unit 813. For example, the processor 811 determines the cause based on which one of the determination ranges the surface potential is within. For example, if the surface potential is within the determination range RADa, the processor 811 determines that the surface potential sensor 71 is abnormal. For example, if the surface potential is within the determination range RADb, the processor 811 determines that the system is abnormal or the surface potential sensor 71 is abnormal. For example, if the surface potential is within the determination range RADc, the processor 811 determines that the photoconductor 2421 or the charger 2422 is abnormal. For example, if the surface potential is within the determination range RADe, the processor 811 determines that the charger 2422 is abnormal. For example, if the surface potential is within the determination range RADf, the processor 811 determines that the charger 2422 is abnormal. For example, if the surface potential is within the determination range RADg, the processor 811 determines that the surface potential sensor 71 is abnormal.

It is noted that, in the above-described example, if the surface potential is within the determination range RADc, the processor 811 does not determine which one of the photoconductor 2421 and the charger 2422 is abnormal.

However, in the charger 2422, the charging potential of the photoconductor 2421 initially shows an upward tendency and then turns to a downward tendency as the rust of the grid increases with the progress of the life. On the other hand, in the photoconductor 2421, the charging potential of the photoconductor 2421 gradually decreases as the photoconductive layer wears and deteriorates with the progress of the life. Therefore, by utilizing such a property, the processor 811 may determine whether the cause of the abnormality is the photoconductor 2421 or the charger 2422 if the surface potential is within the determination range RADc, for example, as follows.

During the execution of a job involving the printing, the processor 811 also counts the life of the charger 2422 and stores the life in the auxiliary storage unit 813, so that the life of the charger 2422 is also acquired by ACT 11. If [$0<m/M<tm$] and [$tn>n/N$] are satisfied, the processor 811 determines that the charger 2422 is abnormal. If [$0<n/N<tn$] and [$tm>m/M$] are satisfied, the processor 811 determines that the photoconductor 2421 is abnormal. Herein, m is the life of the photoconductor 2421. M is a life value predetermined as the life of the photoconductor 2421. n is a life of the charger 2422. N is a life value predetermined as the life of the charger 2422. tm is a predetermined threshold value for the photoconductor 2421 as a positive number smaller than M. tn is a predetermined threshold value for the photoconductor 2421 as a positive number smaller than N.

If the difference in surface potential between one inspection potential and another larger inspection potential is less than the difference in standard value VCa for the same two inspection potentials, that is, if a situation occurs in which the photoconductor 2421 is less likely to be charged than an original photoconductor as the surface potential is larger, the processor 811 may determine that the photoconductor 2421 is abnormal.

Thus, the processor 811 executes information processing based on the control program PRA, so that the computer including the processor 811 as a central portion functions as a determination unit.

If ACT 16 is ended, the processor 811 proceeds to ACT 17. It is noted that, if the surface potential is within the range of the determination range RADd, the processor 811 determines that the surface potential is normal and determines YES in ACT 15, passes ACT 16, and proceeds to ACT 17.

As ACT 17, the processor 811 checks whether there is an unselected inspection potential as the application potential among the inspection potentials acquired by ACT 11. Then, if there is a corresponding inspection potential, the processor 811 determines YES and repeats the processes of ACT 12 and subsequent ACTs in the same manner as described above. However, at this time, in ACT 12, the processor 811 selects the inspection potential that has not been selected as the application potential as new application potential while repeating the processes of ACT 12 and subsequent ACTs.

Thus, the processor 811 repeats the processes of ACT 12 to ACT 17 by sequentially using each of the inspection potentials acquired by ACT 11 as the application potential. That is, the processor 811 executes information processing based on the control program PRA, so that the computer including the processor 811 as a central portion functions as a control unit. Then, if all the inspection potentials are selected as the application potentials, the processor 811 determines NO in ACT 17 and proceeds to ACT 18.

As ACT 18, the processor 811 checks whether there is an abnormality. For example, if the processor 811 executes ACT 16 even once, and the determination result of the causes is stored in the main memory 812 or the auxiliary storage unit 813, the processor 811 determines YES and proceeds to ACT 19.

As ACT 19, the processor 811 executes a notification process for notifying a predetermined notification destination of the determination result stored in the main memory 812 or the auxiliary storage unit 813. It is noted that, if the processor 811 determines that there is an abnormality with respect to a plurality of inspection potentials and the causes determined for each are different, the processor 811 sets all the causes to notification targets. For example, the processor 811 allows the operation panel 105 to display an error via the system controller 104. It is assumed that the error display on the operation panel 105 is represented by the detection of an abnormality, the determination result in ACT 17, and the lighting or blinking of an error screen, a mark, a lamp, or the like. For example, the processor 811 performs a push notification to a predetermined information terminal with notification of the detection of the abnormality of the MFP 100 and the determination result in ACT 17. For example, the processor 811 represents the detection of the abnormality of the MFP 100 and the determination result of ACT 17 in the text of a predetermined e-mail address as a destination, or the processor 811 transmits an e-mail with an attached file representing the detection of the abnormality of the MFP 100 and the determination result of ACT 17. It is noted that, in any of the notification methods, it is preferable to represent a character string, a barcode, or the like representing a uniform resource locator (URL) for accessing information for guiding the coping method or the like for the abnormality.

Thus, the processor 811 executes information processing based on the control program PRA, so that the computer including the processor 811 as a central portion functions as a notification unit.

Then, if ACT 19 is ended, the processor 811 finishes the inspection process this time. It is noted that, for example, if the processor 811 does not execute ACT 16 and, thus, the determination result of the causes is not stored in the main memory 812 or the auxiliary storage unit 813, the processor 811 determines NO in ACT 18 and passes ACT 19, and this inspection process is ended.

As described above, the MFP 100 determines whether the cause as a result of evaluating the relationship between the standard value VCa and the surface potential as an amount in which the surface potential detected by the surface potential sensor 71 deviates from the standard determination range RADd having the standard value VCa as the charging potential of the photoconductor 2421 to be obtained by charging as a central value is the abnormality of the photoconductor 2421, the abnormality of the charger 2422, the abnormality of the surface potential sensor 71, or the abnormality of the system. Thus, according to the MFP 100, the cause of the abnormal charging potential can be specifically identified.

The MFP 100 determines the abnormality by using the grid potential as each of the plurality of inspection potentials. Thus, according to the MFP 100, it is possible to determine a situation where there is a deviation in the method in which the abnormality is generated according to the grid potential.

The MFP 100 notifies a predetermined notification destination of the cause of the determined abnormality. Thus, according to the MFP 100, a person in charge who has received the above-mentioned notification can quickly and accurately recognize the cause of the abnormality.

The embodiment can be performed as various modifications as follows.

The method for evaluating the relationship between the standard value VCa and the surface potential can be changed in any changing manner such as changing based on the magnitude of the difference between the surface potential and the standard value VCa or the ratio of the surface potential to the standard value VCa.

The number of determination ranges may be any number as long as the number of determination ranges is two or more.

The inspection process may be executed by the system controller 104 in cooperation with the printer controller 81.

As long as the apparatus forms an image by the electrophotographic method, the same embodiments as described above can be carried out in various apparatus other than the MFP such as a copier, a printer, and a facsimile machine.

Each function implemented by the processor 811 by information processing in each of the above-described embodiments can be implemented by hardware executing information processing, which is not based on a program, such as a logic circuit or the like. Each of the above-mentioned functions can be implemented by combining software control with the above-mentioned hardware such as a logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a photoconductor;
a charger that charges the photoconductor;
a detector that detects an actual charging potential of the photoconductor after the photoconductor is charged by the charger;
a processor that executes instructions to perform operations, wherein the operations comprise determining one of a plurality of causes related to a charging abnormality of the photoconductor based on a relationship between a standard charging potential of the photoconductor obtained by charging by the charger and a charging potential detected by the detector; and
a controller that allows the charger to charge the photoconductor with a plurality of different charging amounts and allows the detector to detect the actual charging potential of the photoconductor after the photoconductor is charged with the plurality of different charging amounts, wherein
the operations further comprise determining one of the plurality of causes related to the charging abnormality of the photoconductor based on a relationship between the standard charging potential of the photoconductor to be obtained by charging with a certain charging amount and the charging potential detected by the detector with respect to the photoconductor charged with the charging amount in relation to each of the plurality of charging amounts.

2. The image forming apparatus according to claim 1, wherein the operations further comprise determining the cause based on an amount of deviation of the charging potential detected by the detector from a standard potential range if the charging potential detected by the detector is deviated from the standard potential range including a standard charging potential of the photoconductor as a central value.

3. The image forming apparatus according to claim 2, wherein the operations further comprise determining that the photoconductor or the charger is abnormal if the charging potential detected by the detector is included within a first potential range that is in contact with a potential side lower than the standard potential range.

4. The image forming apparatus according to claim 3, wherein the operations further comprise determining that a system of the image forming apparatus or the detector is abnormal if the charging potential detected by the detector is included within a second potential range that is in contact with a potential side lower than the first potential range.

5. The image forming apparatus according to claim 2, wherein the operations further comprise determining that the charger is abnormal if the charging potential detected by the detector is included within a fourth potential range that is in contact with a potential side higher than the standard potential range.

6. The image forming apparatus according to claim 5, wherein the operations further comprise determining that a system of the image forming apparatus or the detector is abnormal if the charging potential detected by the detector is included within a fifth potential range that is in contact with a potential side higher than the fourth potential range.

7. The image forming apparatus according to claim 6, wherein the operations further comprise determining that the detector is abnormal if the charging potential detected by the detector is included within a sixth potential range that is in contact with a potential side higher than the fifth potential range.

8. The image forming apparatus according to claim 1, wherein the operations further comprise:

notifying a predetermined notification destination of the cause determined.

9. A method for an image forming apparatus, comprising:

detecting an actual charging potential of a photoconductor by a charger after the photoconductor is charged by the charger; and determining one of a plurality of causes related to a charging abnormality of the photoconductor based on a relationship between a standard charging potential of the photoconductor obtained by charging by the charger and a charging potential detected;

charging the photoconductor with a plurality of different charging amounts and allowing detection of the actual charging potential of the photoconductor after the photoconductor is charged with the plurality of different charging amounts; and determining one of the plurality of causes related to the charging abnormality of the photoconductor based on a relationship between the standard charging potential of the photoconductor to be obtained by charging with a certain charging amount and the charging potential detected with respect to the photoconductor charged with the charging amount in relation to each of the plurality of charging amounts.

10. The method according to claim 9, further comprising:

determining the cause based on an amount of deviation of the charging potential detected from a standard potential range if the charging potential detected is deviated from the standard potential range including a standard charging potential of the photoconductor as a central value.

11. The method according to claim 10, further comprising:

determining that the photoconductor or the charger is abnormal if the charging potential detected is included within a first potential range that is in contact with a potential side lower than the standard potential range.

12. The method according to claim 11, further comprising:

determining that a system of the image forming apparatus is abnormal if the charging potential detected is included within a second potential range that is in contact with a potential side lower than the first potential range.

13. The method according to claim 10, further comprising:

determining that the charger is abnormal if the charging potential detected is included within a fourth potential range that is in contact with a potential side higher than the standard potential range.

14. The method according to claim 9, further comprising:

notifying a predetermined notification destination of the cause determined.

15. A method for an image forming apparatus, comprising:

detecting an actual charging potential of a photoconductor by a charger after the photoconductor is charged by the charger;

determining one of a plurality of causes related to a charging abnormality of the photoconductor based on a relationship between a standard charging potential of the photoconductor obtained by charging by the charger and a charging potential detected;

determining the cause based on an amount of deviation of the charging potential detected from a standard potential range if the charging potential detected is deviated from the standard potential range including a standard charging potential of the photoconductor as a central value;

determining that the charger is abnormal if the charging potential detected is included within a fourth potential range that is in contact with a potential side higher than the standard potential range;

determining that a system of the image forming apparatus is abnormal if the charging potential detected is included within a fifth potential range that is in contact with a potential side higher than the fourth potential range; and determining that a detector is abnormal if the charging potential detected is included within a sixth potential range that is in contact with a potential side higher than the fifth potential range.

16. The method according to claim 15, further comprising:

determining that the system of the image forming apparatus is abnormal if the charging potential detected is included within a second potential range that is in contact with a potential side lower than a first potential range.

17. The method according to claim 15, further comprising:

notifying a predetermined notification destination of the cause determined.

* * * * *